United States Patent [19]

Parker

[11] 3,748,376

[45] July 24, 1973

[54] RECORDING SYSTEM FOR COLOR VIDEO SIGNALS

[75] Inventor: Norman W. Parker, Wheaton, Ill.

[73] Assignee: Motorola, Inc., Franklin Park, Ill.

[22] Filed: Oct. 15, 1971

[21] Appl. No.: 189,696

[52] U.S. Cl.... 178/5.4 CD, 178/6.7 A, 179/15 AW, 325/39, 325/40, 325/142

[51] Int. Cl. ........ H04b 1/04, H04j 3/02, H04h 5/84

[58] Field of Search .................. 178/5.4 CD, 6.7 A; 179/15 AW, 15 BT, 15 BW; 325/38, 39, 40, 43, 44, 47, 321, 142, 322, 324; 328/109, 119, 153; 329/106; 340/167

[56] References Cited

UNITED STATES PATENTS 3,644,677 2/1972 Cechin .......................... 178/5.4 CD 3,441,674 4/1969 Giordano........................ 179/15 BW

*Primary Examiner*—Howard W. Britton

*Attorney*—Foorman L. Mueller et al.

[57] ABSTRACT

Color signal recording of two channel color information, wherein one channel provides substantially more information than the other channel. The information is converted to a train of pulse width modulated pulses to contain the information, and with the train including more pulses for the one channel than for the other; such as two pulses for the one channel for each pulse of the other channel. Regularly recurring pulses for the two channels are shifted in phase to produce a combined pulse train in which the pulses are at regularly spaced positions. Pulses representing information in the one channel may be duplicated, or may be sampled at twice the rate, to provide two pulses for the one channel for each pulse of the other channel. The pulse train is recorded and reproduced, and then decoded to separate the pulses for the two channels and to position the pulses in each channel to provide regularly occurring pulse trains for each channel.

13 Claims, 6 Drawing Figures

RECORDING SYSTEM FOR COLOR VIDEO SIGNALS

BACKGROUND OF THE INVENTION

Systems have been proposed for electronic video recording (EVR) to provide a record which can be played back as a video and sound reproduction through a standard television receiver. Such a recording can be used to provide a monochrome picture, and also to provide a color picture. A system of this type is described in an article in the IEEE Spectrum for September, 1970, pages 22 to 33.

In the system as described the recording is on photographic film and uses a black and white film image for a monochrome picture, and two black and while film images or frames to provide a color picture. The first of the two images provides the brightness information, and the second provides color information in a way similar to that used for color television. In the system described in the above article, the color information is coded and appears as lines on the photographic film, with the lines having various densities to provide the color information. A system has been described in patent application Ser. No. 8,947, filed Feb. 5, 1970, by Norman W. Parker, wherein the color information is provided by the width of the lines on the film.

In the two prior systems referred to, alternate lines provide information from the two color channels, referred to as the I and Q channels, as in color television. However, for a high resolution color picture, more information is required in the I channel than in the Q channel. In the systems which have been provided, the color information recorded provides only a portion of the I channel information which is utilized to produce the television color picture. If both channels are made adequate to provide the information required for the I channel, this would result in an excessively high pulse repetition frequency, which would be difficult to record.

SUMMARY OF THE INVENTION

An object of the present invention is to provide an improved electronic video recording system wherein samples of information from two color channels are combined into a composite pulse train, with more samples being taken from one channel which has more information than from the other channel.

Another object of the invention is to provide a color recording system for video information wherein color information for two different hues (I and Q) are provided, with two samples being taken for one hue (I) for each sample of the second hue (Q).

Still another object of the invention is to provide a color recording system wherein two regularly spaced pulse trains are pulse width modulated to carry color information and wherein the pulses are shifted in phase and combined to produce a single pulse train of regularly recurring pulses which are recorded and then sensed to reproduce the pulse train, with the pulses being then separated to produce two pulse trains each having regularly recurring pulses.

In practicing the invention, two channel color information from a color television camera includes I channel information having a bandwidth of approximately 1.1 megacycles and Q channel information having a bandwidth of about 0.5 megacycles. Information from the two channels is sampled at a 1.2 megahertz rate to provide a train of pulses for each channel having widths in accordance with the color information signals. The pulse width modulated I channel pulses are applied to a summing circuit at Q phase, and again with a 120° delay. The sampling pulses for the Q channel modulator are shifted 240° and the 240° delayed width modulated pulses for the Q channel are summed with the pulses from the I channel to provide a 3.6 megahertz rate pulse train including two I channel pulses for each Q channel pulse.

In a second embodiment, the sampling pulse rate for the I channel modulator is doubled to provide a 2.4 megahertz sampling rate, with alternate pulses from the modulator being delayed by 60°. This will produce pulses at zero phase and at 180° + 60°, or 240° phase from the I channel. The sampling signal applied to the modulator for the Q channel is delayed by 120° so that the Q pulses are at 120° phase, and when summed with the I channel pulses will be positioned between two I channel pulses. Again, this produces a regularly recurring pulse train with two I channel pulses for each Q channel pulse.

The pulses are recorded and reproduced in any suitably known way, as by line on photographic film as in prior systems, and are derived therefrom, as by scanning across the lines. The derived pulses are separated into the I and Q channels, and the I pulses are changed in position to provide a regularly recurring pulse train.

DETAILED DESCRIPTION

Figure 1:
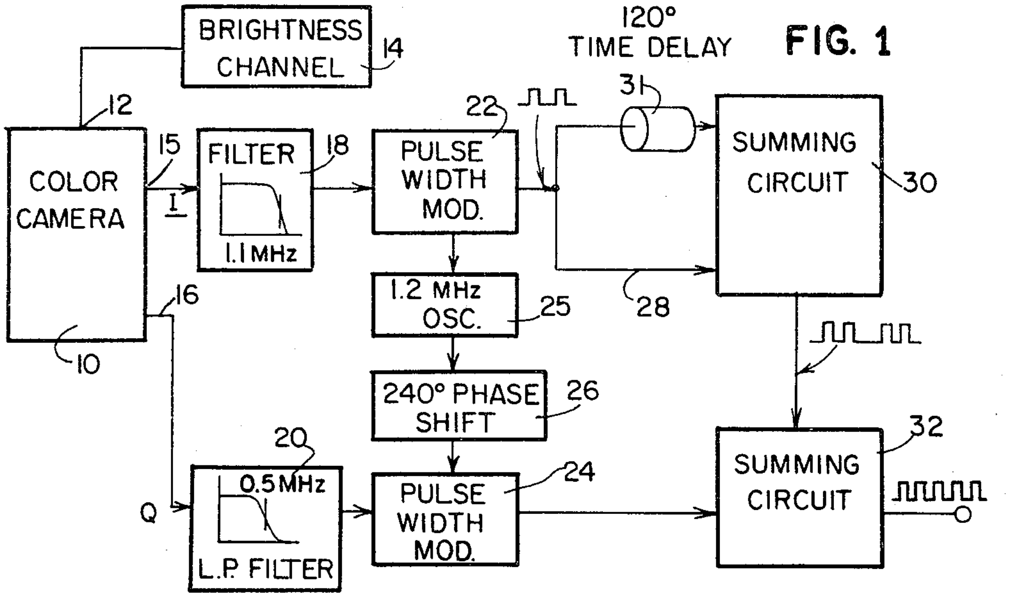
FIG. 1 is a block diagram of one embodiment of the encoder of the invention.

FIG. 1 shows in block diagram form an encoder in accordance with the invention. Color camera 10 may be a color camera of known type which provides a brightness signal at output 12, which is applied to the brightness channel 14. The color camera also provides an I channel color information signal at output terminal 15, and a Q channel color information signal at output terminal 16. These two color signals provide the color information for use with the brightness channel information to produce the color picture.

The I channel signal is applied to a low pass filter 18 which passes signals up to 1.1 megahertz. The Q channel signal is applied to a second low pass filter 20 which passes signals up to 0.5 megahertz. As is well known, the bandwidth of the I signal is substantially greater than that of the Q signal. The output of low pass filter 18 is applied to pulse width modulator 22, and the output of filter 20 is applied to pulse width modulator 24. The pulse width modulators 22 and 24 may be as described in patent application Ser. No. 38,015, filed May 18, 1970 by Robert R. Del Ciello and Francis H. Hilbert, and produce trains of pulses having widths which represent the color information samples from the I and Q channels.

A 1.2 megahertz oscillator 25 applies sampling signals to the pulse width modulator 22, and applies the same signals through the phase shift circuit 26 to the modulator 24. The phase shift circuit 26 provides a 240° delay of the sampling signal to the modulator 24, as compared to the sampling signal applied to modulator 22. The output of modulator 22 is applied through conductor 28 to summing circuit 30. The pulses from the modulator 22 are also applied through delay line 31 to the summing circuit 30. The delay line provides a 120° delay of the pulse applied therethrough, as compared to the pulses directly applied through conductor 28. The pulse train including the direct pulses and the 120 degree pulses from the summing circuit 30 are applied to the summing circuit 32 together with pulses from the pulse width modulator 24. These pulses are delayed by 240° so that they fit into the pulse train with the pulses from summing circuit 30 to provide a regularly spaced pulse train having pulses spaced at 120° intervals. This forms a composite pulse width color signal which can be used to provide lines on the film which records the color information as described in my prior application Ser. No. 8,947 referred to above.

Figure 2:
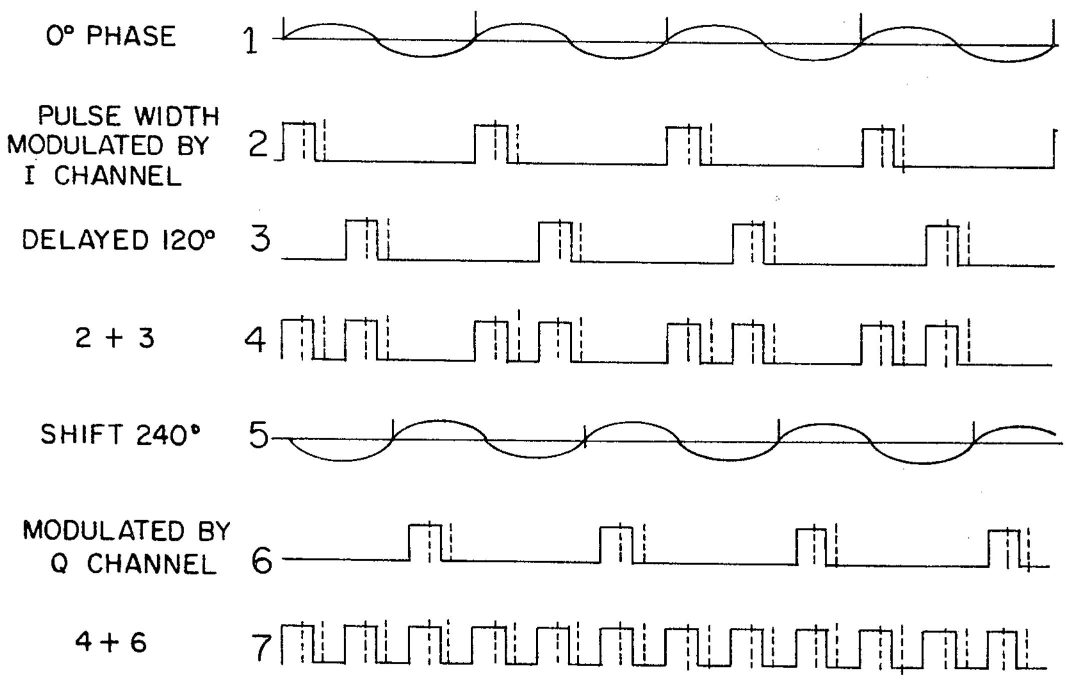
FIG. 2 is a timing diagram showing the waves and pulse trains utilized in the system of FIG. 1.

FIG. 2 is a timing diagram showing the waveforms of the signals in the encoder of FIG. 1. Line 1 of FIG. 2 is the sine wave signal produced by oscillator 25. Line 2 shows the output of the pulse width modulator 22 which is triggered by the positive going zero crossing of the sine wave of line 1. The front edges of the pulses are in fixed positions, with one pulse being produced by each cycle of the sampling wave. The trailing edges of the pulses are modulated by the I channel signal, so that the widths of the pulses depend on the signal in the I channel, which is being sampled. The dotted lines in line 2 show the maximum limits of the pulse width which may be produced in this system, and the solid line shows a particular value intermediate the limits which represents the actual signal being sampled. The width of an average pulse is about 60°, so that the pulses and the spaces therebetween are of substantially equal durations. The pulses as shown in line 2 of FIG. 2 are applied to the summing circuit 30. These pulses are also delayed 120° by delay line 31, as is shown in line 3. Line 4 of FIG. 2 shows the output of the summing circuit 30, which is a pulse train including two pulses in succession which have the leading edges spaced by 120°, with a gap of 240° between the leading edge of the second pulse and the leading edge of the third pulse.

Line 5 of FIG. 2 shows the output of phase shift circuit 26 which shifts the signal from the oscillator 25 by 240°. Line 6 shows the output of pulse width modulator 24, which is a pulse width modulated pulse train having the leading edges of the pulses synchronized with the positive going zero crossing of the sampling wave of line 5 which is applied thereto. Line 7 shows the output of summing circuit 32 which combines the pulse train from the summing circuit 30 with the pulse train from the modulator 24. This pulse train includes regularly recurring pulses with the leading edges thereof regularly spaced by 120°.

It is therefore apparent that in the composite pulse width modulated pulse train forming the color signal there are two pulses representing the I channel for each pulse representing the Q channel. This improves the resolution of the color picture produced from the color signals. Although the two successive pulses from the I channel include the same information, this will not distort the color picture substantially in most cases.

Figure 3:
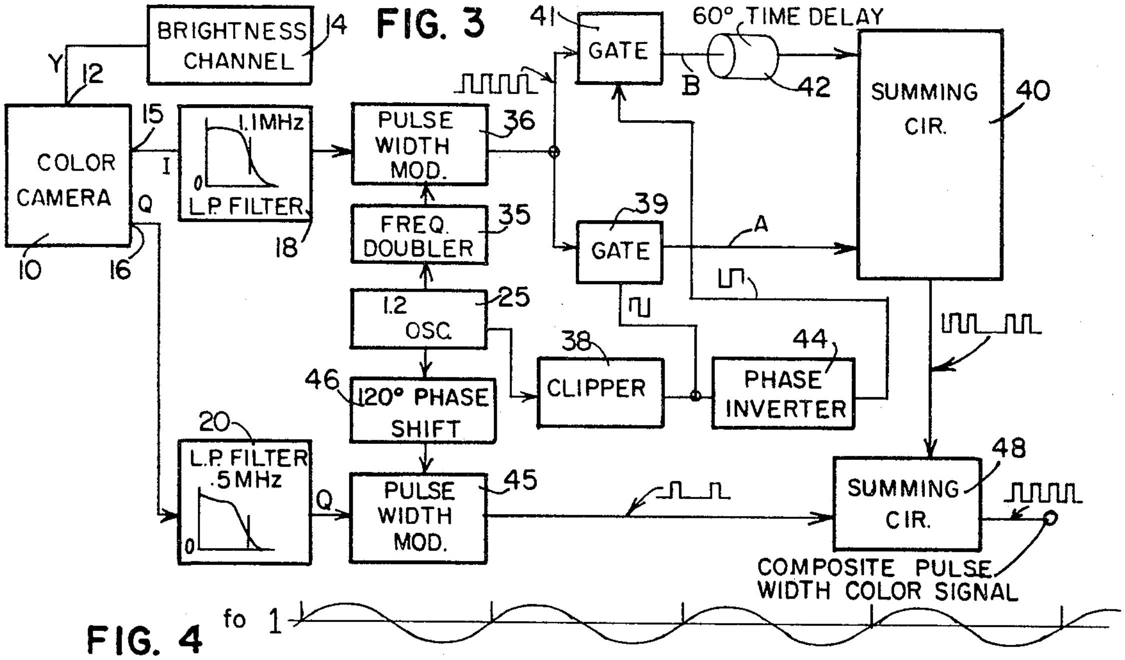
FIG. 3 is a block diagram of a second embodiment of the encoder.

In FIG. 3 there is shown a second embodiment of the encoder of the invention wherein independent samples of the I channel signals are obtained to provide better video resolution. The color camera 10 may be the same as in the system of FIG. 1, and the low pass filters 18 and 20 to which the I channel and the Q channel signals are applied may be the same. The oscillator 25 may also be the same. The signal from the oscillator 25 is applied to frequency doubler 35 which applies twice as many sampling pulses to the I channel modulator 36, as in the system of FIG. 1. This modulator produces pulse width modulated pulses in accordance with the sampling signal applied thereto. The output of oscillator 25 is applied to clipper 28 which produces a square wave which is applied to gate 39 to render the same conductive to apply every other pulse from the modulator 36 to the summing circuit 40. A second gate 41 is connected in series with delay line 42 to apply pulses from the modulator 36 to the summing circuit 40. Phase inverter 44 is coupled from clipper 38 to gate 41 for rendering the same operative to pass alternate pulses from the modulator 36. Since the modulator 36 is sampled at twice the frequency of the oscillator 25, one pulse from the modulator will be during the first half cycle of the oscillator signal and the next during the second half cycle. Gate 30 is opened during the first half cycle of the oscillator wave, and gate 41 is rendered conducting during the second half cycle. The pulses modulated by alternate sampling of the I channel will be passed by gate 41 and delayed in delay line 42 by 60°. Accordingly the pulses applied by delay line 42 to the summing circuit 40 will be spaced by 240° from the pulses applied thereto by gate 39, at the frequency of oscillator 25.

A sampling signal from oscillator 25 is also applied to the pulse width modulator 45 for the Q channel. The sampling signal is applied through phase shift circuit 46 which delays the phase by 120°. Accordingly, the leading edge of the pulses produced by modulator 45 will be delayed 120° from the first pulses produced by modulator 36. The pulses from the summing circuit 40 and the pulses from the modulator 45 are applied to summing circuit 48 which combines the pulse trains to provide a composite pulse train having regularly recurring pulses spaced by 120° at the 1.2 megahertz rate, or pulses at a 3.6 megahertz rate.

Figure 4:
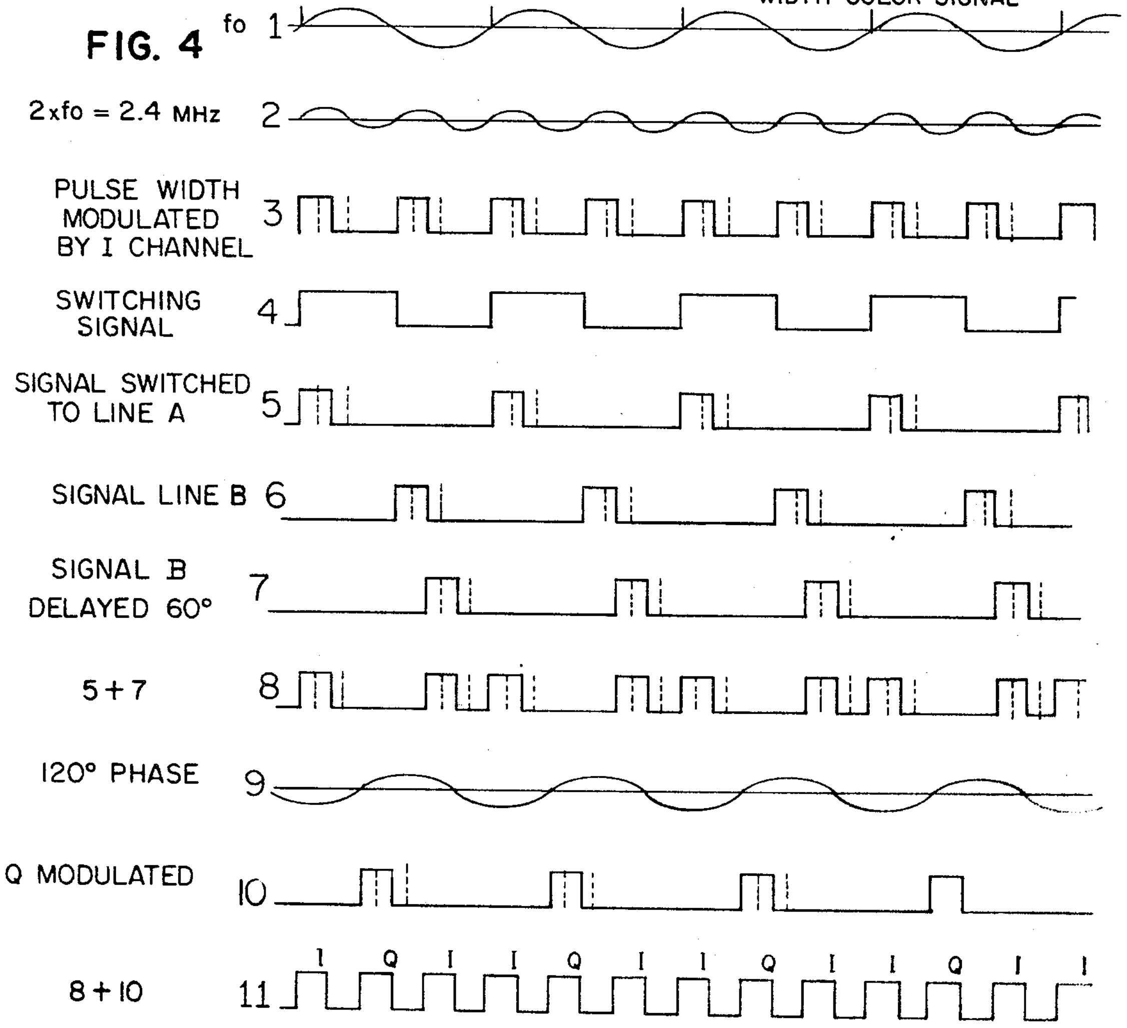
FIG. 4 is a timing diagram illustrating the operation of the system of FIG. 3.

The operation of the circuit of FIG. 3 is illustrated by the waves shown in FIG. 4. The wave on line 1 is the output of the oscillator 25, and the wave on line 2 is the doubled frequency wave produced by the frequency doubler 35. The modulator 36 produces pulses having the leading edge at each positive going zero crossing of the wave in line 2. As shown by line 3, the leading edges of the pulses are spaced by successive cycles of the wave in line 2, which is successive half cycles, or 180° spacing, at the frequency of the oscillator 25 shown in line 1. Line 4 shows the square wave output of clipper 38. The positive portions of this wave operate the gate 39 so that alternate pulses from the modulator 36 (line 3) are passed by gate 39, as shown by line 5. The output of gate 39, therefore is a pulse wave with pulses spaced by 360 degrees at the frequency of oscillator 25. The signal on line 4 is inverted by inverter 44 to operate gate 41 so that the gate is open during the negative portions of the wave as shown in line 4. This applies the alternate pulses from the modulator 36, shown in line 6, to the delay line 42. These pulses are delayed 60° at the 1.2 megahertz frequency, as shown in line 7. The pulses in lines 5 and 7 are summed by summing circuit 40, and the output of this circuit which includes the I channel pulses as shown in line 8 of FIG. 4.

The sampling wave from the oscillator 25 is delayed by 120 degrees by phase shift circuit 46 to provide the wave as shown in line 9 of FIG. 4. This wave is applied to modulator 45 to provide pulses at each positive going zero crossing, as shown in line 10 of FIG. 4. These pulses are delayed by 120° so that they fit into the space between the pulses from summing circuit 40 which have leading edges spaced by 240° at 1.2 megahertz. The summing circuit 48 combines the pulses from summing circuit 50 and the pulses from pulse width modulator 45 to produce the pulse train shown by line 11. It is apparent that the pulses in this pulse train are regularly spaced by 120° at the 1.2 megahertz frequency to form a pulse train having a repetition rate of 3.6 megahertz which contains the color information from both the I and Q channels.

Figure 5:
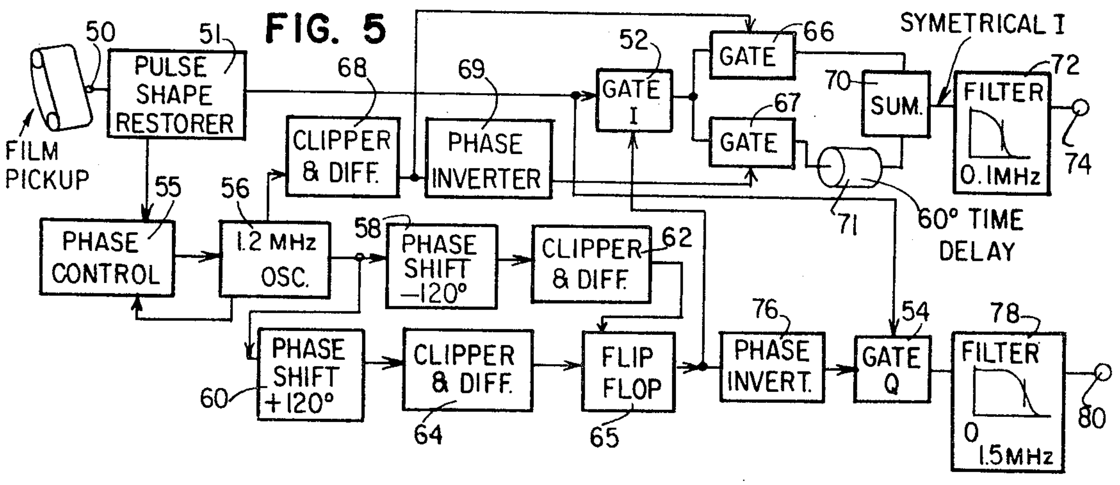
FIG. 5 is a block diagram of the decoder of the invention.

The variable width pulse trains produced by the encoder of FIG. 1, or the encoder of FIG. 2, can be recorded in various ways, as on photographic film as previously mentioned. The pulse train can then be rereproduced by scanning the lines on the film. The pulses can also be recorded and reproduced by use of some other form of recording. FIG. 5 is a block diagram of a decoder circuit for receiving the reproduced pulse train and deriving separate I and Q channel pulse trains of the color information signal therefrom.

In FIG. 5, the signal from a film pick up 50 is applied to pulse shape restorer 51 which squares up the signal. Two outputs are derived from the pulse shape restorer 51, the first output going to gates 52 and 54, and the second output going to phase control circuit 55 for controlling the frequency of the local oscillator 56. The local oscillator 56 operates at the same 1.2 megahertz frequency of the oscillator 25 of the encoder, being stabilized by the received pulse train. The output of the oscillator 56 is applied to phase shift circuits 58 and 60, with the circuit 58 providing a phase delay of 120° and the circuit 60 providing a phase advance of 120°. The outputs of the phase shift circuits 58 and 60 are applied to clipping and differentiating circuits 62 and 64, respectively, which products sharp trigger pulses. These pulses are applied to the two inputs of flip-flop 65, and control the same so that a gating signal having a duration of 240° is applied to gate 52. This will allow the gate 52 to pass the two adjacent I channel pulses.

The I channel pulses passed by gate 52 are applied to the inputs of gates 66 and 67. The signal from the oscillator 56 is applied through clipper 68 to provide a square wave phase inverter 69, which applies the opposite phase signal to gate 67 to render megahertz which is applied to gate 66. This causes gate 66 to pass the first of the adjacent I channel pulses and apply the same to summing circuit 70. The clipped wave from clipper 68 is also applied to gate 67 to rencer the same operative to pass the second I channel pulse. This pulse is spaced by 120° from the first pulse and is applied through delay line 71 which has a 60° time delay to provide a 180° time spacing between the two I channel pulses. The second pulse is also applied to the summing circuit 70 and the combined pulse train, which is at a 2.4 megahertz rate, is applied through the low pass filter 72 to provide the I channel output at terminal 74.

As previously stated, the output of flip-flop 65 provides a gating signal having a 240° duration which includes the two I channel pulses. This signal is inverted by phase inverter 76 to provide a gating signal for gate 54 to render the same conducting during the presence of the Q channel pulse. This pulse is applied through low pass filter 78 to the Q channel output terminal 80. The signals at the terminals 74 to 80 can be converted to signals which are substantially the same as the signals which are applied to the decoder circuits from the terminals 15 and 16 of the color camera (FIGS. 1 and 3).

Figure 6:
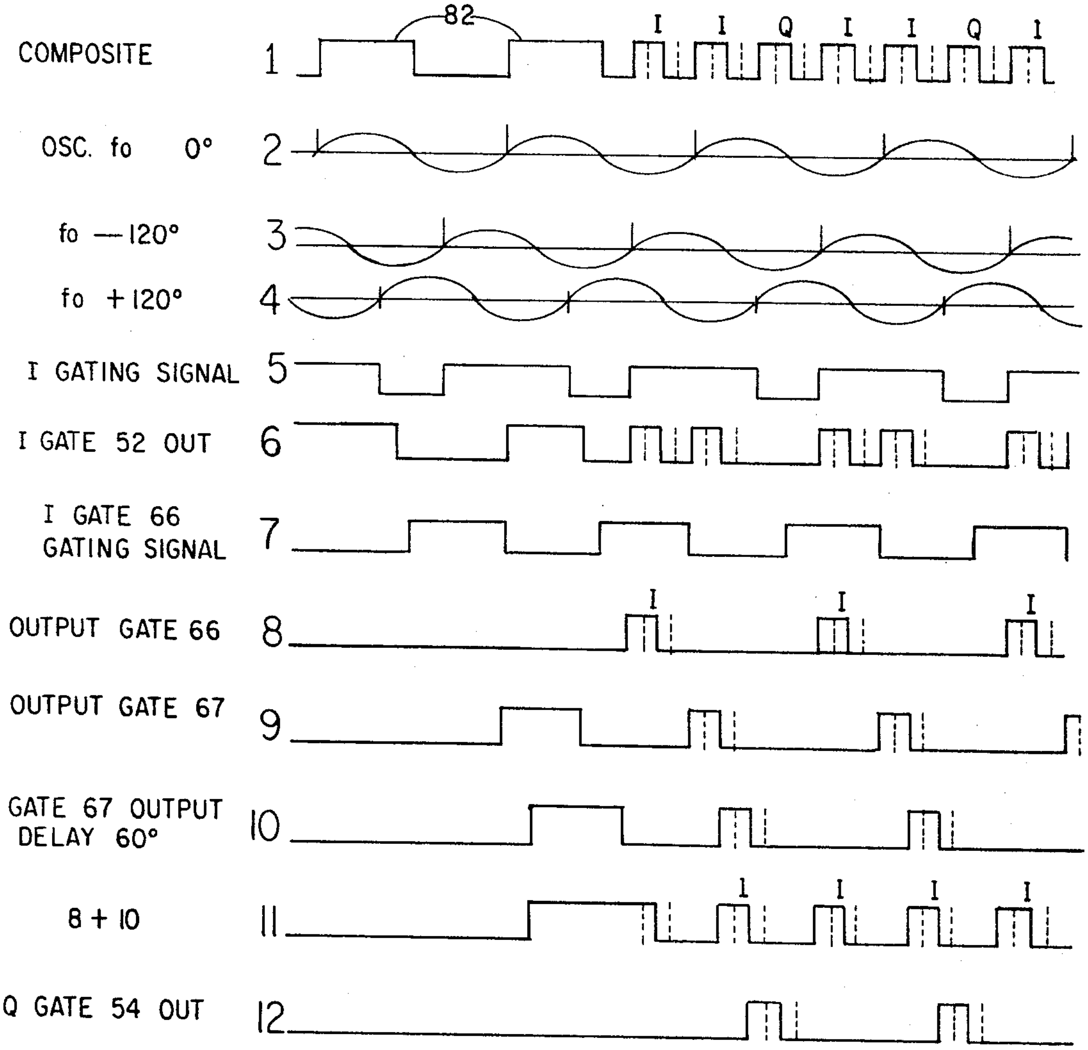
FIG. 6 is a timing diagram illustrating the operation of the decoder of FIG. 5.

FIG. 6 illustrates the operation of the decoder circuit of FIG. 5. Line 1 shows the composite color pulse train with the I and Q channel pulses being preceded by preline sync pulses 82. These pulses are at one-third the repetition rate of the composite color pulses or 1.2 megahertz. Line 2 shows the output from oscillator 56, and lines 3 and 4 of FIG. 6 show the oscillator signal as shifted in phase by the phase shift circuits 58 and 60, respectively. The wave in line 3 is delayed by 240° with respect to the wave in line 4. Line 5 shows the gating signal for the I channel pulses as produced by the flip-flop 65 in FIG. 5. This operates gate 52 to provide an output as shown in line 6. This output includes the groups of two adjacent I channel pulses, with a spacing of 240° between the leading edge of the second pulse of one group and the leading edge of the first pulse of the next group. The output of the clipper 68 is shown in line 7, and the positive half cycles act to operate gate 66 to pass the first of the two adjacent I channel pulses, as shown in line 8 of FIG. 6. The opposite phase gating signal is applied to gate 67, and this passes the second of the two adjacent I channel pulses, as shown by line 9. This train of pulses is delayed by the delay line 71 to produce the pulse train as shown in line 10. The pulses in the train shown in lines 8 and 10 are at 180° with respect to each other and are combined by the summing circuit 70 to provide a train of regularly spaced pulses as shown by line 11 in FIG. 6. The resulting I channel pulse train has a repetition rate of 2.4 megahertz.

The Q channel pulses are obtained by inverting the gating wave shown by line 5. It will be seen that this passes the Q pulses, which are every third pulse in the received pulse train. These pulses are spaced at regular intervals and have a repetition rate of 1.2 megahertz, as shown by line 12 of FIG. 6.

The decoder circuit of FIG. 5 can be used with pulse trains produced by either the encoder circuit of FIG. 1 or the circuit of FIG. 3. In each case there are two adjacent I channel pulses separated by a single Q channel pulse in the pulse train.

Accordingly, it is seen that the system described makes it possible to increase the bandwidth or information in the I channel by a ratio of 2 to 1 while retaining the same information in the Q channel. This provides the required information for a high resolution color picture. This improvement is obtained by increasing the overall bandwidth required by only 50 percent from 2.4 megahertz to 3.6 megahertz.

I claim:

1. In a color television reproducing system for displaying a color picture in response to a record medium having first and second image areas thereon, with the first area representing the brightness of the picture and the second area representing color information, and wherein the second area has a plurality of lines having widths which represent two channel color information associated with the image on a corresponding part of the first area, the method which includes the steps of, applying information to the record medium to form a first number of said lines having the widths thereof modulated by information from one channel interspersed with a greater number of said lines having the widths thereof modulated by information from the second channel, scanning said lines to produce pulse signals varying with the widths thereof, separating the pulse signals providing information for said one channel and said second channel, and shifting the position of at least a part of the pulse signals providing information for said second channel to provide a pulse train with uniform pulse spacing.

2. The method of claim 1 wherein the widths of said first number of lines are modulated by information from the Q color channel, and wherein said greater number of lines is two times said first number and the widths thereof are modulated by information from the I color channel.

3. A system for operation with two channel color signal information, with more information being provided from one channel than the other, including in combination, first and second pulse width modulators for receiving a sampling wave and producing a train of pulses modulated in width in response to a signal applied thereto, means for applying to said first modulator a first color information signal of a first band-width from the first information channel, means for applying to said second modulator a second color information signal having a smaller bandwidth than said first bandwidth from the second information channel, oscillator means coupled to said first pulse width modulator for applying thereto a sampling wave of a given frequency, phase shift means coupling said oscillator means to said second modulator for applying a sampling wave shifted in phase with respect to the wave applied to said first modulator, summing means for combining a plurality of pulse width modulated pulse trains, means coupling said first pulse width modulator to said summing means for applying a modulated pulse train thereto, means including delay means coupling said first pulse width modulator to said summing means for applying a second modulated pulse train thereto, and means coupling said second pulse width modulator to said summing means for applying a third modulated pulse train thereto, whereby said summing means produces a combined pulse train including two pulses from said first modulator for each pulse from said second modulator.

4. A system in accordance with claim 3 further including, recording means for recording said combined pulse train on a record medium, reproducing means for scanning the record medium to reproduce said combined pulse train, further oscillator means operative at the given frequency and synchronized by the reproduced pulse train, gate means coupled to said further oscillator means for separating from the reproduced pulse train the pulses from said first modulator and the pulse from said second modulator, said gate means further separating the two pulses from said first modulator from each other, means for delaying one of the pulses from said first modulator to provide spacing between said pulses from said first modulator of 180° at said given frequency, and means combining said delayed pulse and the other pulse from said first modulator.

5. A system for producing a pulse train providing two channel color signal information, with more information being provided from one channel than the other, including in combination, first and second pulse width modulators for receiving a sampling wave and producing a train of pulses modulated in width in response to a signal applied thereto, means for applying to said first modulator a first color information signal of a first bandwidth from the first information channel, means for applying to said second modulator a second color information having a smaller bandwidth than said first bandwidth from the second information channel, oscillator means coupled to said first pulse width modulator for applying thereto a sampling wave of a given frequency, phase shift means coupling said oscillator means to said second modulator for applying a sampling wave thereto shifted 240° with respect to the wave applied to said first modulator, summing means for combining a plurality of pulse width modulated pulse trains, means coupled to said first pulse width modulator for applying the modulated pulse train therefrom to said summing means, means providing a delay of 120° coupled to said first pulse width modulator for applying said modulated pulse train therefrom to said summing means, and means coupled to said second pulse width modulator for applying the modulated pulse train therefrom to said summing means, whereby said summing means produces a combined pulse train with pulses having leading edges spaced at 120° intervals, and including two pulses from said first modulator for each pulse from said second modulator.

6. A system in accordance with claim 5 wherein the first information channel is the I channel having a bandwidth of the order of 1 megahertz, the second information channel is the Q channel having a bandwidth of the order of 0.5 megahertz, and said oscillator means produces a wave having a frequency of the order of 1.2 megahertz.

7. A system for producing a pulse train providing two channel color signal information, with more information being provided from one channel than the other, including in combination, first and second pulse width modulators for receiving a sampling wave and producing a train of pulses modulated in width in response to a signal applied thereto, means for applying to said first modulator a first color information signal from the first information channel having a first bandwidth, means for applying to said second modulator a second color information signal from the second information channel having a smaller bandwidth than said first bandwidth, oscillator means for producing a sampling wave of a given frequency, frequency doubling means coupling said oscillator means to said first modulator for applying thereto a sampling wave having frequency twice said given frequency, phase shift means coupling said oscillator means to said second modulator to apply a sampling wave thereto shifted 120° with respect to said wave applied to said first modulator, summing means for combining pulses from a plurality of pulse width modulated pulse trains, first gate means coupling said first pulse width modulator to said summing means for applying thereto alternate modulated pulses, time delay means providing a delay of 60°, second gate means coupling said first pulse width modulator to said time delay means for applying thereto modulated pulses alternate to the pulses applied by said first gate means, means coupling said time delay means to said summing means to apply the delayed alternate pulses thereto, and means coupling said second pulse width modulator to said summing means for applying the modulated pulse train thereto, whereby said summing means produces a combined pulse train including two spaced pulses from said first modulator interspersed between adjacent pulses from said second modulator.

8. A system in accordance with claim 7 wherein the first information channel is the I channel having a bandwidth of the order of 1 megahertz, the second information channel is the Q channel having a bandwidth of the order of 0.5 megahertz, and said oscillator means produces a wave having a frequency of the order of 1.2 megahertz.

9. The system of claim 7 including means coupling said oscillator means to said gate means for controlling the same to operate alternately to apply alternate pulses from said first modulator means therethrough.

10. A system in accordance with claim 9 further including, recording means for recording said combined pulse train on a record medium, reproducing means for scanning the record medium to reproduce said combined pulse train, further oscillator means operative at the given frequency synchronized by the reproduced pulse train, further gate means coupled to said further oscillator means and to said reproducing means for separating the two pulses from said first modulator from each other and from the pulse from said second modulator, means for delaying one of the pulses from said first modulator to provide spacing at 180° at said given frequency between said pulses from said first modulator, and means combining said delayed pulse and the other pulse from said first modulator.

11. A system in accordance with claim 10 wherein said further gate means includes first and second gates, and third and fourth gates coupled to said first gate, means for applying the reproduced pulse train to said first and second gates, first means coupled to said further oscillator means and to said first and second gates for operating said first gate to pass the two pulses from said first modulator to said third and fourth gates and for operating said second gate to pass the pulse from said second modulator, time delay means connected to said fourth gate, summing means connected to said third gate and to said time delay means, and second means coupled to said further oscillator means for operating said third and fourth gates so that said third gate passes one of said pulses from said first modulator to said summing means and said fourth gate passes the other one of said pulses from said first modulator through said time delay means to said summing means, said time delay means providing the delay required so that uniformly spaced pulses are applied to said summing means.

12. A decoder for separating pulses in a pulse train which includes recurring sets of first and second modulated pulses representing a first channel signal interspersed with recurring third pulses representing a second channel signal, with said pulses having leading edges which are uniformly spaced, such decoder including in combination, oscillator means operative at a frequency of one third the repetition rate of the pulses, gate means, means for applying the pulse train to said gate means, means coupled to said oscillator means and to said gate means for applying pulses to said gate means so that the first and second pulses representing the first channel are separated from each other and from the third pulse representing the second channel, means for delaying the second pulse to produce a spacing of 180° between said first and second pulses at the frequency of said oscillator means, and means combining said first pulse and the delayed second pulse.

13. A decoder in accordance with claim 12 wherein said gate means includes first and second gates, and third and fourth gates coupled to said first gate, means for applying the pulse train to said first and second gates, first means coupled to said oscillator means and to said first and second gates for operating said first gate to pass the first and second pulses to said third and fourth gates and for operating said second gate to pass the third pulse, time delay means connected to said fourth gate, summing means connected to said third gate and to said time delay means, and second means coupled to said oscillator means for operating said third and fourth gates so that said third gate passes the first pulse to said summing means and said fourth gate passes the second pulse through said time delay means to said summing means, said time delay means providing the delay required so that uniformly spaced pulses are applied to said summing means.

* * * * *